(12) United States Patent
De Waard et al.

(10) Patent No.: US 12,039,792 B2
(45) Date of Patent: Jul. 16, 2024

(54) POSITION-DETERMINING DEVICE

(71) Applicant: LELY PATENT N.V., Maassluis (NL)

(72) Inventors: Nicky De Waard, Maassluis (NL); Martin Ivan Ganeff, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 319 days.

(21) Appl. No.: 17/422,293

(22) PCT Filed: Jan. 23, 2020

(86) PCT No.: PCT/NL2020/050035
§ 371 (c)(1),
(2) Date: Jul. 12, 2021

(87) PCT Pub. No.: WO2020/153844
PCT Pub. Date: Jul. 30, 2020

(65) Prior Publication Data
US 2022/0087208 A1  Mar. 24, 2022

(30) Foreign Application Priority Data

Jan. 24, 2019 (NL) .................................... 2022442

(51) Int. Cl.
*G06K 9/00* (2022.01)
*A01J 5/007* (2006.01)
(Continued)

(52) U.S. Cl.
CPC ............ *G06V 20/647* (2022.01); *A01J 5/007* (2013.01); *A01J 5/0175* (2013.01);
(Continued)

(58) Field of Classification Search
CPC .. G06V 20/647; G06V 10/145; G06V 10/764; G06V 20/10; G06V 40/10;
(Continued)

(56) References Cited

U.S. PATENT DOCUMENTS 5,483,441 A * 1/1996 Scofield ............... A01K 1/0613
382/110
7,039,220 B2 * 5/2006 Kriesel .................. G01B 11/25
382/110
(Continued)

FOREIGN PATENT DOCUMENTS

CN  1628237 A   6/2005
CN  102818773 A  12/2012
(Continued)

OTHER PUBLICATIONS

Combined Chinese Office Action and Search Report dated Dec. 6, 2021 in Chinese Patent Application No. 202010070452.2 (submitting English translation only), 10 pages.
(Continued)

*Primary Examiner* — Shervin K Nakhjavan
(74) *Attorney, Agent, or Firm* — Oblon, McClelland, Maier & Neustadt, L.L.P.

(57) ABSTRACT

A position-determining device, and a milking device, that determines a relative position of an object and includes a 3D time-of-flight camera with a 2D arrangement of pixels configured to repeatedly record an image of a space. A control unit is connected and includes an image-processing device. The 3D time-of-flight camera has a controllable light source and is configured to record a 2D image by means of reflected emitted light and collect distance information. The image-processing device is configured to recognize an object in the 2D image using image-processing criteria and determine distance information and relative position by analysing the 2D image and the distance information. Due to the fact that distance information, which is often much more noisy than 2D brightness information, can be determined with far fewer image points, the position is determined more quickly and reliably.

18 Claims, 2 Drawing Sheets

(51) Int. Cl.

| | | |
|---|---|---|
| *A01J 5/017* | (2006.01) | |
| *G01B 11/06* | (2006.01) | |
| *G01S 17/08* | (2006.01) | |
| *G01S 17/894* | (2020.01) | |
| *G06T 7/521* | (2017.01) | |
| *G06T 7/66* | (2017.01) | |
| *G06T 7/70* | (2017.01) | |
| *G06V 10/145* | (2022.01) | |
| *G06V 10/764* | (2022.01) | |
| *G06V 20/10* | (2022.01) | |
| *G06V 20/64* | (2022.01) | |
| *G06V 40/10* | (2022.01) | |
| *H04N 23/56* | (2023.01) | |

(52) U.S. Cl.
CPC .......... *G01B 11/0608* (2013.01); *G01S 17/08* (2013.01); *G01S 17/894* (2020.01); *G06T 7/521* (2017.01); *G06T 7/66* (2017.01); *G06T 7/70* (2017.01); *G06V 10/145* (2022.01); *G06V 10/764* (2022.01); *G06V 20/10* (2022.01); *G06V 40/10* (2022.01); *H04N 23/56* (2023.01); *G06T 2207/10024* (2013.01); *G06T 2207/10028* (2013.01)

(58) Field of Classification Search
CPC ... G06V 2201/121; A01J 5/007; A01J 5/0175; A01J 5/00; A01J 7/00; G01B 11/0608; G01S 17/08; G01S 17/894; G01S 17/06; G01S 17/89; G06T 7/521; G06T 7/66; G06T 7/70; G06T 2207/10024; G06T 2207/10028; H04N 23/56
See application file for complete search history.

(56) References Cited

U.S. PATENT DOCUMENTS

| | | | | |
|---|---|---|---|---|
| 7,490,576 | B2* | 2/2009 | Metcalfe | A01J 5/0175 |
| | | | | 119/14.08 |
| 7,545,956 | B2* | 6/2009 | Miyahara | G01S 15/86 |
| | | | | 382/106 |
| 9,286,678 | B2* | 3/2016 | Zhu | G06T 7/80 |
| 10,915,783 | B1* | 2/2021 | Hallman | G06N 3/02 |
| 11,148,294 | B2* | 10/2021 | Hayashi | B25J 5/00 |
| 2004/0032974 | A1 | 2/2004 | Kriesel | |
| 2005/0011466 | A1* | 1/2005 | Doyle, II | A61K 39/42 |
| | | | | 119/518 |
| 2010/0224140 | A1* | 9/2010 | Bareket | G06T 7/12 |
| | | | | 382/110 |
| 2012/0180729 | A1 | 7/2012 | Van Dorp | |
| 2014/0130745 | A1* | 5/2014 | Van Halsema | G05D 7/0635 |
| | | | | 119/14.08 |
| 2017/0094934 | A1* | 4/2017 | Van Adrichem | A01J 5/0175 |
| 2017/0154424 | A1* | 6/2017 | Uchiyama | G01S 3/00 |
| 2017/0228885 | A1* | 8/2017 | Baumgartner | H04N 13/204 |
| 2018/0082016 | A1* | 3/2018 | Moshier | A01K 11/006 |
| 2019/0041518 | A1* | 2/2019 | Spickermann | G01S 17/08 |
| 2019/0095720 | A1* | 3/2019 | Ju | H04N 13/20 |
| 2019/0143145 | A1* | 5/2019 | Laurence, Jr. | A61N 5/1081 |
| | | | | 600/1 |
| 2019/0180092 | A1* | 6/2019 | Foresman | G06F 18/2113 |
| 2021/0012520 | A1* | 1/2021 | Zhou | G01P 15/00 |
| 2021/0207943 | A1* | 7/2021 | Fujiwara | G06T 7/62 |
| 2021/0382496 | A1* | 12/2021 | Yasuda | G05D 1/0219 |

FOREIGN PATENT DOCUMENTS

| | | | | |
|---|---|---|---|---|
| CN | 104297758 | A | 1/2015 | |
| CN | 104968194 | A | 10/2015 | |
| CN | 105941165 | A | 9/2016 | |
| EP | 2 947 604 | A1 | 11/2015 | |
| EP | 2498593 | B1 * | 1/2017 | A01J 5/007 |
| EP | 3 241 431 | A1 | 11/2017 | |
| EP | 3241431 | A1 * | 11/2017 | A01J 5/0175 |
| EP | 3 388 864 | A1 | 10/2018 | |
| WO | WO 2011/059315 | A1 | 5/2011 | |
| WO | WO-2017052361 | A1 * | 3/2017 | A01J 5/017 |

OTHER PUBLICATIONS

"Study and Application of Image and Graphics Technology", Beijing Society of Image Graphics, pp. 59-60, China Vehicle University Press, May 2009, total 5 pages (Submitting Translation of pp. 59-60 only).

International Search Report dated Mar. 19, 2020 in PCT/NL2020/050035 filed on Jan. 23, 2020.

Hussmann et al., "Three-Dimensional TOF Robot Vision System", IEEE Transactions on Instrumentation and Measurement, IEEE Service Center, vol. 58, No. 1, 2009, pp. 141-146, XP011232132.

Gargalik et al., "Object tracking in 3D using depth map", 28$^{th}$ Spring Conference on Computer Graphics—Conference Materials and Posters, Smolenice, Slovakia, 2012, Retrieved from the Internet: URL:https://www.researchgate.net/profile/Zoltan_Tomori2/publication/260208280_Object_tracking_in_3D_using_depth_map/links/53d0be030cf2fd75bc5d3e69/Object-tracking-in-3D-using-depth-map.pdf [retrieved on Oct. 7, 2019], 5 total pages, XP055629373.

Akhloufi, "3D vision system for intelligent milking robot automation", Visual Communications and Image Processing, vol. 9025, 2013, pp. 90250N-1-90250N-10, XP060035858.

Luan, X., et al., "Multimedia Information Processing Technology" May 31, 2016, pp. 70-71, claims 1-12 (submitting English translation only).

* cited by examiner

POSITION-DETERMINING DEVICE

The present invention relates to a position-determining device for determining a position of an object in a space with respect to the position-determining device.

Such position-determining devices can be used in many applications, such as for navigation of autonomous vehicles or treatment of an object, such as by robots in a production line or such.

In principle, some form of stereovision is required in order to determine a position in a space. Known position-determining devices often comprise either two 2D cameras and a control unit for comparing the images by means of for example triangulation, or a 3D device with built-in distance determination means, in order to be able to determine the required position data. Examples of the latter 3D devices are laser or lidar scanners, as well as 3D time-of-flight cameras (referred to below as ToF cameras), as described in the article "A 3D Time of Flight Camera for Object Detection", by Th. Ringbeck and B. Hagebeuker, in "Optical 3-D Measurement Techniques 9-12 Jul. 2007, ETH Zürich". Such 3D ToF cameras emit modulated light themselves, in which case the reflected radiation strikes a series of pixels. By determining either the round trip time of the radiation or the phase shift of the modulation, the distance of the camera to an object which reflected the radiation to the pixel can be determined.

In practice, such known devices have various drawbacks. For example, the stereo cameras comprising two 2D cameras require a significant amount of image processing in order to be able to correlate the images correctly with each other. In addition, the two cameras often have to be relatively far apart in order to achieve a sufficient degree of accuracy, so that the resulting device will be accordingly large. Although 3D ToF cameras are much more compact, they still require a relatively long exposure time in order to provide a sufficient amount of noise-free (distance) information, as a result of which, for example, quick movements are difficult to capture. In addition, they produce a very large amount of information, as a result of which it is often laborious and time-consuming to determine the actual position from this information.

There is therefore a need for a position-determining device which partly removes the drawbacks mentioned and by means of which a compact, yet quick and efficient determination of the position of an object can be achieved.

The invention achieves this object by means of a position-determining device according to Claim 1, in particular a position-determining device for determining a position of an object in a space with respect to the position-determining device, comprising a 3D time-of-flight camera with a 2D arrangement of pixels configured to, in particular repeatedly, record an image of the space, and a control unit which is connected to said camera and comprises an image-processing device for processing the recorded image, the 3D time-of-flight camera comprising a light source for emitting light which is controllable by the control unit, and being configured both to record a 2D image of the space and to collect distance information for one or more pixels by means of reflected emitted light, wherein the image-processing device is configured to recognise a possible object in the 2D image on the basis of one or more image-processing criteria, which possible object comprises a first set of the pixels of the image, to determine distance information for a subset of said first set of pixels which is smaller than said first set, and to determine the position with respect to the camera by means of analysis of the 2D image and of the distance information of said subset of pixels.

The present invention is based on the insight that it is often not necessary to collect distance information for every recorded pixel in the particular image of an object, since an object in the 2D image will provide a continuous, uninterrupted set of pixels, also with regard to colour and/or brightness. In order to calculate the position in a space, it is not necessary to establish the 3D position of every point of that set, so that producing and analysing a 3D representation of the object is not required. In addition, "the position" of a spatially extended object is actually not the position of every single point of that set anyway, but rather a position of a single point of the object, unless the spatial boundaries of the object are indicated. Often, for example, a maximum extent/position in a certain direction determines the position of the object, such as the centre of a sphere, or a corner of a cube. In such a situation in particular, it will be clear that knowing the complete spatial position of each of the pixels contains a large amount of redundant information. Although 3D ToF cameras in principle determine the distance information for all pixels simultaneously, this information then still has to be read out and processed by the image-processing device, for example in order to arrive at coordinates of the associated points, and thus at the spatial position. By, according to the invention, only choosing a subset, this process can be performed more quickly and efficiently. In this case, the following is an important consideration. Most 3D ToF cameras have pixels which determine both brightness information and distance information from the captured reflected radiation. Often, but not necessarily always, this radiation is (near) infrared radiation and the brightness information is often absolute, that is to say not wavelength-dependent. Therefore, the brightness image is thus in shades of grey, without any colour information. However, the same pixel detects the distance information of exactly the same point of the space, due to the fact that the phase shift of the emitted (modulated) radiation which is reflected from that point in the space is determined. In this case, it is important that there is no parallax or other displacement between the brightness image and the distance information, and that this information is also determined (virtually) simultaneously. This means that as soon as pixels have been chosen whose distance information is deemed to be relevant, the distance information which is already available can be read out and processed. This saves reading and processing time. In addition, the brightness information can be determined much more quickly with sufficient signal strength and reliability than the 3D distance information. Therefore, the desired subset can be determined so quickly that hardly any delay in collecting this desired distance information will occur. Incidentally, it is also possible to determine the desired distance information from a subsequent recorded image, but this will work well mainly when the object moves slowly or not at all with respect to the ToF camera.

In particular, the position-determining device is configured to repeatedly determine the position of the object, with the 3D ToF camera repeatedly recording an image of the space. In this embodiment, it becomes possible to follow the object when it moves. This may be a movement of the object itself in the space, but may also be a relative movement as a result of the position-determining device moving or being displaced. Following the object will become more accurate as the image repetition frequency increases and/or the accuracy and reliability of the recorded image information improves. Both factors can be improved using the present invention by only using some of the 3D distance information of the camera.

Specific embodiments are described in the attached dependent claims and in the following part of the beschrijving.

In embodiments, the image-processing device is configured to determine the said subset of the possible object in the 2D image as only 1 pixel. In particular, said one pixel is surrounded on all sides by other pixels of said first set. As a result thereof, the risk of strong local variations in the distance information is reduced, as is the risk of inaccuracies. More particularly, said one pixel is a geometric centre of gravity of said possible object. Without more detailed information about the objects, there is a considerable risk of a local extreme in the distance information and thus only a small local variation in this distance, if at all, which may benefit accuracy.

It will be clear that a subset of only one pixel results in the absolute minimum amount of (distance) information to be read out and processed, while it is often still possible to determine a useful spatial position. A clearly advantageous use relates to an object with a virtually flat top side, in which case it is, for example, only necessary to determine whether a possible object detected in the image is an actual object or only a stain on the background or the ground. As soon as it is clear from the distance to the camera that it is an actual object, it is already possible to determine the 3D position in a space with respect to the camera in a satisfactory manner on the basis of the 2D image, such as a brightness image. Another example relates to identical objects of different size. In this case, it is already sufficient to determine the distance to the camera for one point in the subset of the possible object in order to determine the position of the object on the basis of the 2D image. If the objects in this example are differently sized spheres, then the one point will advantageously be chosen to be the centre. From the distance to the camera determined for that pixel and also, preferably, by the known distance to the ground for the associated viewing direction of the camera, it is possible to determine the diameter of the sphere using simple trigonometry. Using the known position of said centre with respect to the camera, it is then possible to determine the full position of the sphere. Something similar also applies to other objects having a shape which is known per se. It should be noted that it is useful to measure the background and/or ground beforehand, i.e. once. Each pixel of the camera is then associated with a certain distance to this background and/or ground, so that the background and/or ground is completely mapped.

In embodiments, the image-processing device is configured to determine the said subset of the possible object in the 2D image as precisely 2 or 3 pixels. Determining the position for two or three points, respectively, by means of these embodiments may help to determine the orientation of the object. Of course, this works best with objects which are known to have one or more large side surfaces. For example, when three points have been measured, the orientation of a surface has been completely determined, which may be advantageous for efficient calculations of the position of the associated object.

In embodiments, the image-processing device is configured to determine distance information for each of the possible objects for an associated subset of pixels if it recognises several different sets of pixels of the recorded image as possible objects, and furthermore to classify the possible objects on the basis of the distance information determined therefor according to a predetermined classification criterion. For example, the image-processing device recognises two possible objects in the image. Distance information of a subset of the associated pixels is determined for each possible object. Assuming, as a criterion, that the object has to be within a certain distance range (whether or not in its entirety). By then evaluating the distance information for each possible object, the image-processing device (or the position-determining device as a whole) is able to determine which of the possible objects is the "correct" object and only determines the position of the latter.

In specific embodiments, the 2D arrangement of pixels also comprises colour pixels, in particular RGB pixels. In this case, the 3D ToF camera is configured to record a colour image of the space. In this case, the 3D camera is provided with additional colour pixels which are preferably distributed between the pixels for collecting distance information. In the past, the latter were considerably larger, thus leaving space for the smaller RGB pixels. But also with the distance-measuring pixels, which have meanwhile become smaller and which are often sensitive to either only the emitted (monochromatic) radiation or to all radiation, it is advantageous to include RGB pixels in the 2D arrangement. Although this may be to the detriment of the 3D resolution which may be achievable, this is less relevant in the case of the present invention. Conversely, the incorporation of RGB pixels offers the advantage of increasing the amount of available information, in combination with known and efficient techniques for collecting and processing it. For example, the colour information which is available now offers advantages when determining objects, due to the fact that the contrast in the image may differ for each colour, etc. Incidentally, the total amount of information to be processed does not actually have to increase if a choice can be made with regard to the colours which are to be read. This means that sometimes the image with the red (R) pixels yields a much better result for object recognition than the green or blue pixels, or obviously any other combination. By then only reading the associated information from the pixels, in this case the red pixels, the amount of information is not greater than if the brightness of the 3D pixels were to be read. Incidentally, the colour/RGB pixels now no longer coincide exactly with the 3D distance information pixels, but in practice the shift is so small that it will not be of importance, especially not if a pixel at a distance from the edge of a possible object is chosen.

The above-described aspect of the invention relates to a position-determining device which, in principle, only uses one measuring or sensor device, namely the 3D time-of-flight camera. In this case, only a 2D image, such as a brightness image, is used, in addition to a distance or height measurement of one point. Alternatively, it is possible to determine the position by means of a separate height-determining device. According to another aspect, the invention therefore advantageously relates to a position-determining device for, in particular repeatedly, determining a position of an object in a space with respect to the position-determining device, comprising a 2D camera with a 2D arrangement of pixels, configured to, in particular repeatedly, record an image of the space, a height-determining device for determining a height of the object in the space, and a control unit which is connected to said camera and the height-determining device and comprises an image-processing device for processing the recorded image, wherein the image-processing device is configured to recognise a possible object in the 2D image on the basis of one or more image-processing criteria, and to determine the position with respect to the camera by analysis of the 2D image and the determined height. The 3D camera is in this case replaced by a standard 2D camera. This has the advantage that the information density and also the image frequency can be (considerably) higher than in the case of a 3D camera. Also, it is easier in this case to use an RGB camera, so that more information, in the form of colour information, is available for detecting and recognising objects.

The height-determining device is not particularly limited, but advantageously comprises a laser distance meter or a series of photoelectric cells. This makes it possible to measure the height of an object in a relatively simple manner, for example using a vertical arrangement of the laser distance meter above the object, or a lateral arrangement of the photoelectric cells (emitter(s) on one side, detector(s) on the other side). In the context of the invention, the "object" is often a dairy animal. In this case, in particular the height at the position of the spine is important. This can be measured, for example, by moving transversely across the dairy animal with a laser scanner mover, a rotating mirror, etc. With photoelectric cells, a series of photoelectric cells may be provided laterally, wherein the highest cell that records radiation indicates the upper boundary of the animal.

The invention furthermore relates to a milking device according to Claim 8, in particular a milking device for milking a dairy animal, comprising milking cups, a robot arm for attaching the milking cups to teats of the dairy animal, as well as a robot control unit for controlling the robot arm, wherein the control unit comprises a position-determining device according to the invention. With such milking robot devices, it is advantageous to have a satisfactory, reliable and quick position-determining device, because dairy animals, as a result of growth and due to the udder filling up, change shape over time, and furthermore are obviously of greatly varying shapes and sizes with respect to each other, and in addition may make more or less wild moves resulting from stress or playfulness. It is important to be able to attach the milking cups correctly and quickly to the teats under all these circumstances. In this case, for example, the number of movements of the robot arm has to remain limited in order to prevent unnecessary unrest and other inconveniences with the animals and also to render the capacity of the milking device as large as possible. The invention achieves this by means of the new animal-positioning device. The description given thereof, including the advantageous and special embodiments, therefore applies in full to this milking device according to the invention.

In embodiments, the position-determining device is configured to determine the position of the teats of the dairy animal. As described above, attaching milking cups to the teats is the most important task of the robot arm in an automatic milking device. In this case, it should be noted that it is not only the dairy animals themselves that move, but that the udder with the teats may also move, due to being flexibly suspended with respect to, for example, the legs of the dairy animal, and are thus greatly readily movable in the space. In addition, the milk let-down reflex which is triggered by oxytocin only lasts for a limited time, so that it is also very important for this reason that the milking cups are attached to the teats quickly and efficiently. The invention aids this by making it possible to efficiently distinguish teats in the image from, for example, legs, tail or fence.

In embodiments, the milking device comprises a milking stall for milking the dairy animal and the position-determining device is configured to determine whether a dairy animal is present in the milking stall and/or to determine the position of the dairy animal in the stall. In particular, the robot control unit is configured to control the robot arm on the basis of the position of the dairy animal in the milking stall determined by the position-determining device.

It is important not to move the robot arm unnecessarily, but only when a dairy animal is actually present in the milking stall. It may also be dangerous for the dairy animal if it moves too soon. Most dairy animals, and in particular cows, are so large that they are very easily recognisable by determining the distance at a suitable spot in the image, such as in the centre of the milking stall, from one or two pixels, and compare it to the previously carried out background measurement. It is possibly even more important to determine the position of the dairy animal in the milking stall. The reason for this is that, on the basis of this information, the robot arm can be arranged efficiently under the dairy animal. On the one hand, this may, for example, prevent a collision with a leg. On the other hand, the robot arm together with the teat-detecting device arranged thereon can be arranged in such a base position that the latter can determine the positions of the teats even more quickly. In this case, "the position" of the dairy animal is preferably, but not exclusively, the position of the rear end of the dairy animal, such as the position of the base of the tail. Particularly with cows, this is a relatively fixed point which, in addition, is relatively easy to determine. To this end, reference is made to the article translated into English entitled "Report of study and investigation concerning milking system for milk cow aiming at resource saving and high productivity breeding" from 1984. This document teaches to look for the point of attachment of the tail in a 2D image of the cow taken from above in order to make the attachment efficient, and to then position the robot arm with the teat-detecting device on the basis of the previously determined correlation between udder/teat position and the position of the point of attachment of the tail.

It so happens that dairy cows as well as other dairy animals can differ greatly in height, up to half a metre within a herd. If the base of the tail is not vertically under the camera, a lateral displacement with respect to this vertical at different heights will result in different positions in the x, y plane. According to the present invention, the correct position can be determined more accurately when the height of the dairy animal is known. And it is exactly the height which can readily be determined by means of a distance (i.e. height) measurement of only a single pixel of the dairy animal. Due to the relatively flat top side of a cow, the choice of pixel is not particularly limited. Other easily recognisable points which indicate a virtually constant height may also be used. Nevertheless, it is advantageous to take a point on the spine, which can be done in a fundamentally advantageous manner by choosing a point along a centre, viewed in the longitudinal direction, of the object which has been recognised as a dairy animal/cow. These points form a line which will virtually correspond to the spine. The knowledge of the height of the dairy animal/the cow makes it more readily possible to couple a laterally moved position to a spatial position. This is particularly evident when following the position of the dairy animal in a space, which is important in turn when attaching moving dairy animals.

In an alternative embodiment, the milking device is provided with a position-determining device according to the second aspect of the invention, wherein the height-determining device comprises an animal identification device for identifying the dairy animal to be milked, as well as a database which is operatively connected to the milking device that contains a height for each dairy animal, and wherein the height-determining device determines the height of the dairy animal by retrieving the height data associated with the identified dairy animal from the database. The animal identification device which is always provided in an automatic or milking robot device then identifies the dairy animal to be milked when it presents itself in the milking stall, and then retrieves a height value associated with that dairy animal from the database. This removes the need for a separate height-measuring device, because the height is determined from previously stored data. On the other hand, it is thus not possible to take into account a height which has changed as a result of growth or which has been input incorrectly.

The invention will now be explained with reference to the drawing, in which.

Figure 1:
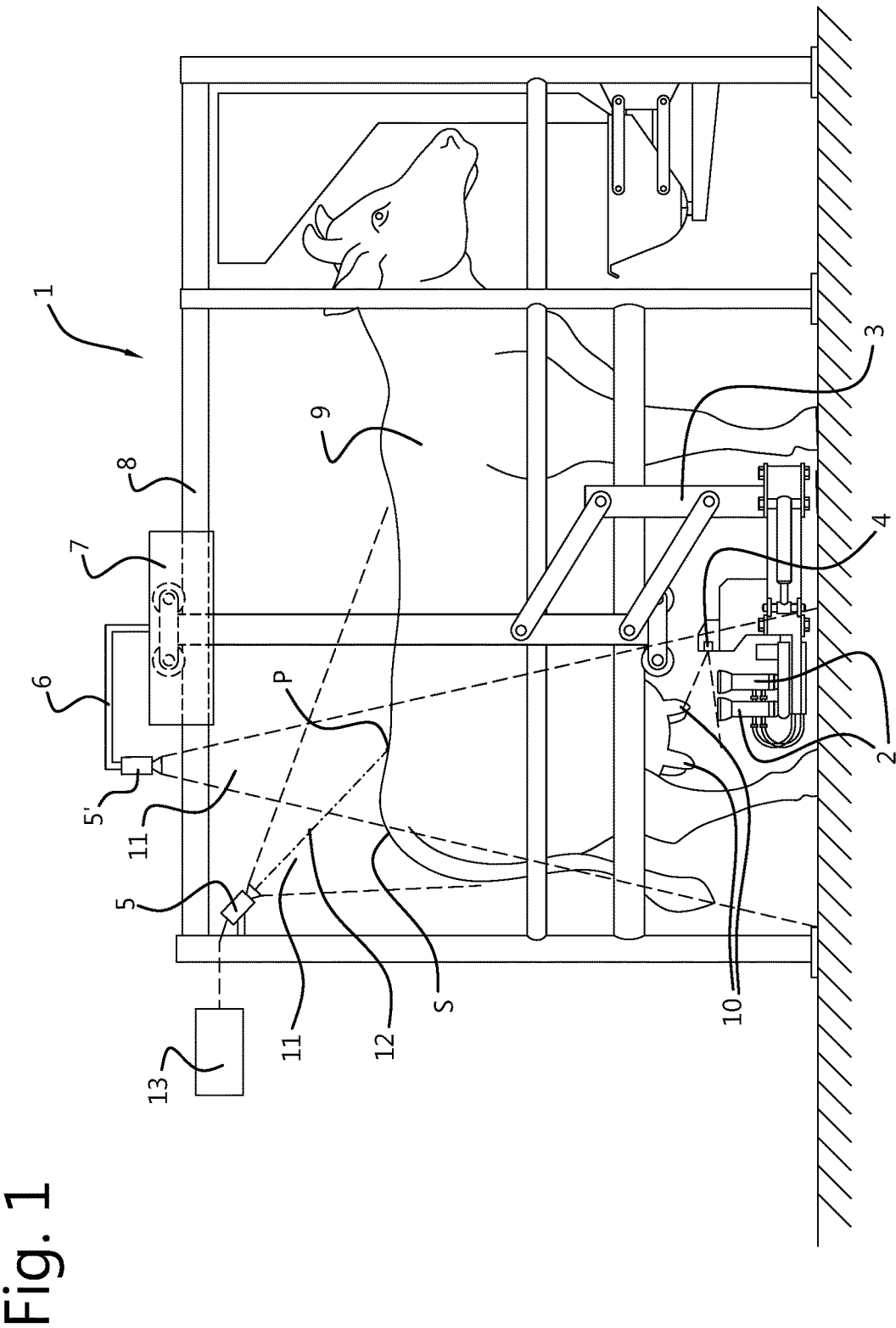
FIG. 1 shows a diagrammatic side view of a milking device according to the invention.

FIG. 1 shows a diagrammatic side view of a milking device 1 according to the invention. The milking device 1 comprises milking cups 2 on a robot arm 3, as well as a teat-detecting camera 4. A 3D time-of-flight (ToF) camera is denoted by reference numeral 5, and an alternative ToF camera by reference numeral 5', on a connecting arm 6 towards a trolley 7 on a rod 8.

A dairy animal, in this case a cow, is denoted by reference numeral 9 and has teats 10. ToF camera 5 has an emitted ray 11, whereas reference numeral 12 denotes a line or direction towards a point P exactly above the centre between the teats 10. The position of the base of the tail is denoted by the letter S. Finally, reference numeral 13 denotes a control unit. For the sake of clarity, the usual components have not been illustrated or denoted, such as a light source in the 3D ToF cameras 5, 5', and an image-processing device which is incorporated in the latter or in the control unit 13.

Such a milking device 1 automatically attaches milking cups 2 to the teats 10. To this end, the teat-detecting camera 4 determines the position of the teats 10 with respect to the camera. The camera 4 is preferably placed close to the teats before the positions of these can be determined. In this case, the fact that the position of the udder, and thus also of the teats, with respect to a fixed point of the cow 9 is relatively stable, except for the fact that the cow slowly grows, is often used. It is then advantageous to know a relation between, for example, the position of the base of the tail S and the position of the teats, either in the form of a point P exactly above the centre of the teats or determined after attaching the milking cups 2 to the teats 10. Such a relation can be stored in the control unit 13. During a subsequent milking operation, it then suffices to detect the same point S (or, if desired, another, previously determined point) and to determine the associated estimated position of point P and/or directly of the teats via the relation in order to have a good base position for the robot arm 3 to swing in and for placing the teat-detecting camera 4.

It is known per se to determine the position of point S using a 3D camera, by producing a 3D representation of the cow 9 and analysing it in 3D by looking at, for example, edge detection where the height of the cow drops quickly, etc. According to the present invention, such a 3D analysis is not required and it suffices to measure a single distance to the camera 5 (or 5'), such as to point P. This will be explained later.

The illustrated 3D ToF camera 5 has a relatively wide emitted light ray 11, so that there is a good chance that the cow 9 will appear sufficiently clearly in an image, and the relevant one or more points can be recorded by the camera 5. Alternatively, it is also possible to mount, via a connecting arm 6, a 3D ToF camera 5' onto a trolley 7 which is displaceable along a rod 8 of the milking device 1. Thus, the camera 5' can always be positioned in optimum manner, in which case it is advantageous that the ray of the camera 5' can be narrower, thus improving the reliability, accuracy and luminosity of the 3D ToF camera 5'.

For example, animal recognition is used when placing the trolley, but also when trying to find the above-described relation between udder/teat position and position of the base of the tail S. In every automatic milking device, the cows are recognisable by means of a tag and tag-reading system which is not shown separately here for the sake of simplicity.

Figure 2:
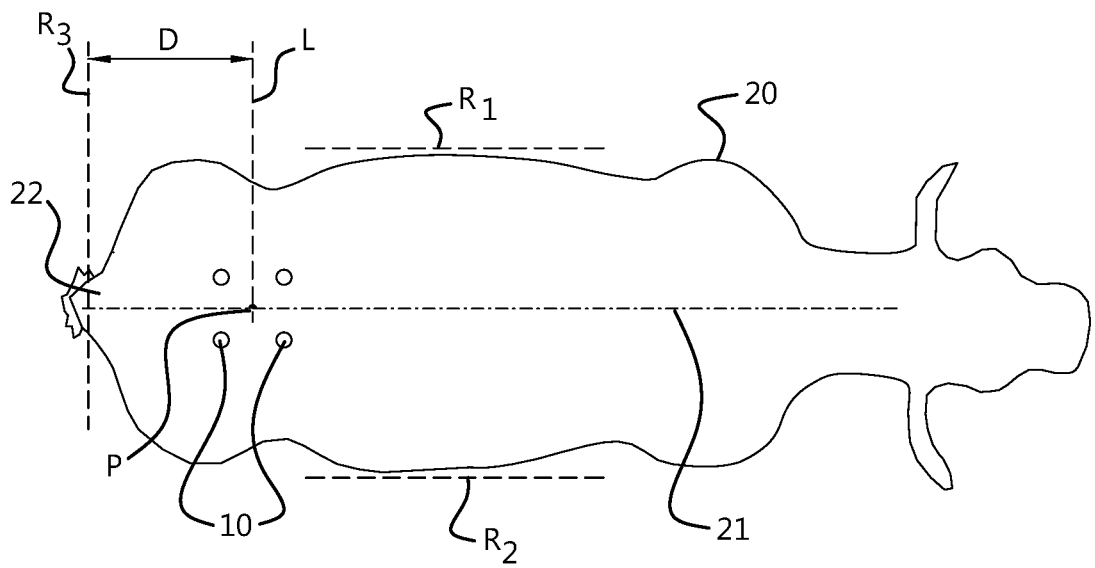
FIG. 2 shows a diagrammatic image recorded by a position-determining device according to the invention.

FIG. 2 shows a diagrammatic image recorded using a position-determining device according to the invention. For the sake of clarity, the image shows only an outline 20. The outline 20 may have been found, for example, by means of edge detection techniques, brightness thresholds or other image-processing techniques which are known per se. The outline will not always be found so clearly immediately, but will often be intrapolated in a satisfactory manner by means of knowledge about the objects to be expected (e.g. through animal identification and knowledge about, in this case, cows) and artificial intelligence in the form of algorithms. Such a set of pixels surrounded by an outline is interpreted as an "object". The detection of such an object may be supported by determining a distance to a point in the object and comparing it to a background value, that is to say a distance which was measured without any object being present.

In the case of the milking device 1 according to FIG. 1, this amounts to determining a correlation between the viewing direction of the camera 5, 5', and a reference distance to the floor of the milking device. If an object is recognised, in this case the outline 20 of a cow, then the presence can be confirmed if a measured distance up to a point in the centre in the object or, for example, along the line 12 to a point P, is (much) smaller than the associated reference distance.

It is also possible that several candidate objects are recognised in the image. The control unit can then analyse the object candidates by measuring a distance for every candidate and not only compare it to the reference distance, but also to an expected value of this distance, for example on the basis of a determined animal identity or general knowledge of the cows 9 which enter the milking device.

The outline 20 is then analysed by the control unit 13. Some useful analysis steps are worked out below, but it is emphasized that other steps are also possible.

First, a centre line 21 in the image of the cow is determined by determining a longitudinal direction of the outline and dividing this in two. In principle, this centre line 21 represents the position of the spine of the cow, as well as the line of highest points on the back of the cow. In principle, this centre line may also be determined from the centre between parallel tangent lines R1 and R2 to the outline.

Subsequently a tangent line R3 to the outline 20 is determined at right angles to the centre line 21. The intersection 22 of the centre line 21 and the tangent line R3 is in this case determined as the fixed point by the control unit. This point 22 corresponds to the position of the base of the tail of the cow. The expected position of the teats with respect to this base of the tail can be determined by the control unit. This is determined, for example, from the position of a point P in the centre between the four teats, which point is situated at a distance D along the centre line 21 in a forward direction. In principle, this distance D is a fixed value which will only change in a growing cow, but can easily be determined once the milking cups have been attached. Furthermore, a reference position with respect to said point P could be determined for each individual teat 10, so that a subsequent robot arm can take the milking cup to a more precise starting position.

Finally, a height of the cow is determined in a point on the centre line, for example in a point which corresponds to a projection of point P on the centre line, and in the figure this obviously corresponds to point P. For the pixel in the image which corresponds to that point, the height is determined by means of the 3D properties of the camera. The position thereof can, as such, be determined satisfactorily from a ratio between the (reference) distance D and the total length of the cow. This ratio may also be updated for a growing cow from time to time. It should be noted that the height of point P in principle corresponds well to the height of point 22, the position of the base of the tail which is to be determined. Of course, this point 22 can also be used to measure the distance and to determine the height or even the coordinates therefrom. However, the height of point P can be determined more easily and accurately, because point P is situated on a more or less flat part of the cow and point 22, by contrast, is situated on an edge, so that the distance determination by means of the 3D ToF camera for point P is more reliable. In general, it is therefore advantageous if the point for determining the height of the animal is not situated on the outline 20, but, by contrast, is surrounded on all sides by other points of the object in the image. It is also possible to use the geometric centre of gravity of the outline 20 as an alternative point, for example. Due to the relative flatness of the back of the cow, the height thereof still corresponds well, so that deviations will still be acceptable.

Figure 3:
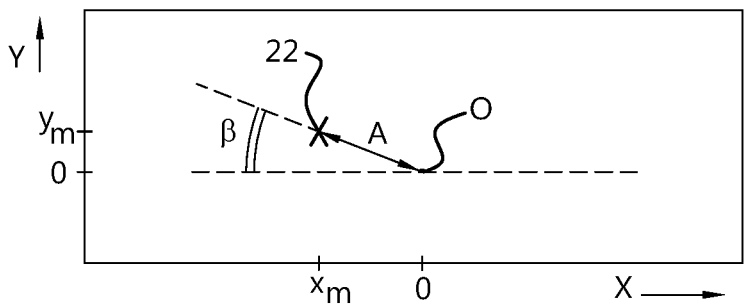
FIG. 3 shows a diagram for determining the position according to the prior art.

FIG. 3 diagrammatically shows a diagram for determining the position according to the prior art. Here, it will be illustrated that the above-described way of determining the position has to be enhanced. After all, in the prior art, the control unit determines an x and/or y coordinate of a fixed point of the cow image by means of the image of the camera. That point 22, such as for example determined by means of the method described for FIG. 2, is indicated in the diagram. It should be noted that point 22 is outside the line y=0 here. This corresponds to a cow which is not situated exactly in the centre underneath the camera, which is after all readily possible. In addition, a calibration for the x and the y coordinate is indicated with respect to an origin (0, 0) which corresponds to the centre of the camera and is denoted by the letter "O". According to this calibration, the coordinates of the point 22 would be equal to ($x_m$, $y_m$). However, this does not take the height into account, that is to say the z coordinate, on which the point 22 is situated. In reality, the control unit does not determine the real coordinates of point 22 from the cow image of the camera, but, on the one hand, the angle $\beta$ in the x-y plane (pole coordinates), as well as an angle $\alpha$ to the vertical through the origin. This angle is a direct and unambiguous function of the distance in the cow image between the point 22 and the origin O. In other words, every ring with a radius A of pixels around the pixel associated with "O", the vertical projection on the illustrated floor surface, is associated with an angle $\alpha$ to the vertical. This function only has to be determined once and could even be calculated on the basis of the optical properties of the camera, in particular the image angle of the lens and of the imaging device with the pixels. It will be clear that at an angle $\alpha$ not equal to zero, no unique set of values for x and y can be determined. Conversely, it is possible to determine the angle $\alpha$ to the vertical from the distance A in the cow image.

The "real" x and y coordinates can thus not be determined without knowing the height under the camera or the height above the floor surface. According to the invention, those real coordinates can actually be accurately determined if more information about the height is known, as is illustrated by means of FIG. 4.

Figure 4:
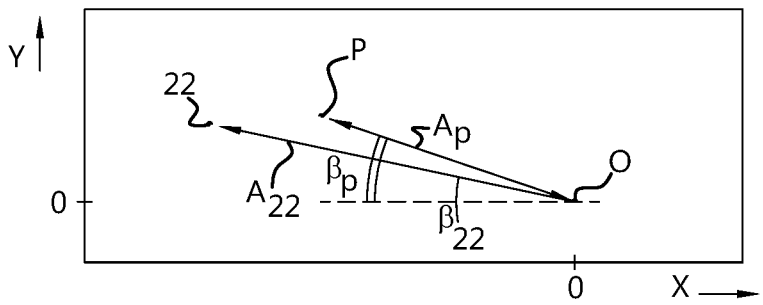
FIG. 4 shows a diagram for calculating a coordinate using a position-determining device according to the invention.

FIG. 4 diagrammatically shows such a diagram for calculating coordinates using a position-determining device according to the invention. The cow image shows, in addition to the origin O, the point 22 (=the base of the tail) as well as the point P for which the distance to the camera is determined. For point P, the distance to the origin in the cow image is determined as $A_P$, in arbitrary units, and therefrom the angle $\alpha_P$, as well as the angle $\beta_P$ of the line through "O" and P in the cow image with respect to the line y=0. For point 22, corresponding values are determined as $A_{22}$, $\alpha_{22}$ and $\beta_{22}$. In addition, the real distance d to the camera is determined for point P by means of the 3D ToF camera. The height $h_P$ under the camera, i.e. under the point O, can then be determined from:

$$h_P = d \cos(\alpha_P).$$

This height equates with the corresponding height of point 22. After some goniometric calculations, the coordinates of point 22 in the space can then be determined as (in each case apart from the minus sign):

$$x_{22} = d(\sin \alpha_P / \tan(\alpha_{22})) \times \cos(\beta_{22})$$

$$y_{22} = d(\sin(\alpha_P))/(\tan(\alpha_{22})) \times \sin(\beta_{22})$$

$$h_{22} = h_P = d \cos(\alpha_P)$$

Incidentally, a 3D ToF camera often already comprises or is supplied with a program which automatically determines the coordinates of a measured pixel, so that it is not necessary to carry out the entire abovementioned method. However, it should be noted that the point whose coordinates are thus determined still has to be determined by the user or automatically by the control unit.

Another important note is the fact that this example has used the fact that the orientation of the animal is parallel to the line y=0. Should the animal be at an angle, then the orientation will also have to be determined by, for example, 2D analysis of the determined outline 20, in order take into account the relation between the position of point S and the position of the teats/point P.

It will be clear that variations are possible with regard to the choice of, for example, the point for determining the height and the way of calculating the coordinates. It is emphasized again, that the present invention provides advantages because it only analyses a two-dimensional image and by means of a single distance measurement greatly improves the accuracy of the determination of the position from that two-dimensional image without requiring a three-dimensional image analysis which demands a large amount of computing power.

It should also be noted that it is possible to measure the distance for two or three points of the cow and to determine the coordinates for these. In this way, it is possible to better take into account the form properties of the cow or another dairy animal, but still without having to analyse a complicated 3D representation. The 2 or 3 points for example determine a line or a plane, respectively, so that, for example, the orientation of the cow becomes even clearer. In turn, the relation between base of the tail position and teat position can consequently be used in an optimum manner.

Another alternative relates to a 3D ToF camera with additional RGB pixels, preferably provided between the ToF pixels. This makes it possible to collect additional colour information in the image, which may assist the control unit in analysing the 2D image, for example by the fact that determined object candidates can be excluded or by the fact that it is easy to determine that two or more candidates belong together due to matching colour or the like.

Finally, it is pointed out here that the position-determining device in the illustrated example is intended to determine the animal's position. However, it is also possible to determine a position of other objects. This may refer generally to a stall in which an entity (object, animal, human) with freedom of movement ends up in each case. Consideration may be given to (trap) cages in a zoo or in the wild, in spaces in which people may end up, etc.

A specific example which is mentioned here relates to the milking device as illustrated in FIG. 1. The teat-detecting camera 4 illustrated there may in principle also be designed as the position-determining device according to the invention. In this case, the camera takes a picture in which one or more teats are visible. Consider that the robot arm 3 with the camera 4 is preferably already in a position in which one teat (or optionally several) is visible in the image. The image is again a 2D image and yet again, a single distance measurement up to a point on the teat will suffice to determine the position with respect to the camera 4 with sufficient accuracy. Replace "outline of the cow 9" with "outline of the teat 10" here and the above-described method can be adopted. For this reason, no further elaboration is deemed necessary here. It should however be noted that in this case there will be more frequent occurrences of several objects being recognised in an image. Often, it will then be desirable to perform a distance measurement for each recognised object (at least for each teat). Thus, it is for example easy to determine whether a teat is a front teat or a rear teat, or even a hind leg. In this case, it might also be possible to classify a recognised object more accurately. For example, it may happen that a front teat and a rear teat in the image partly cover each other. The overall object then no longer resembles a teat, but is more similar to an object with a kind of "W" as an outline. In such a case, the control unit/camera 4 could test whether the two legs of the W are at a (considerable) different distance. If so, then it is probably a set of two teats. Thereupon, the control unit can take certain decisions with respect to the outline of the "W" and how to divide it into two teats.

The described embodiment and the alternatives mentioned are not intended to be limitative. The scope of protection is determined by the attached claims.

The invention claimed is:

1. A position-determining device configured to repeatedly determine a position of an object in a space with respect to the position-determining device, comprising:
   a 3D time-of-flight camera with a 2D arrangement of pixels configured to repeatedly record an image of the space, and
   a control unit which is connected to the camera and comprises an image-processing device for processing a recorded image, the 3D time-of-flight camera comprising a light source for emitting light which is controllable by the control unit, and is configured both to record a 2D image of the space and to collect distance information for one or more pixels by means of reflected emitted light,
   wherein the image-processing device is configured:
      to recognise a possible object in the 2D image on the basis of one or more image-processing criteria, wherein the possible object comprises a first set of the pixels of the image,
      to determine distance information concerning a distance from the camera to the object for a subset of the first set of pixels which is smaller than the first set, and;
      to determine a position of the object with respect to the camera by means of analysis of only the 2D image and of the distance information of the subset of the first set of pixels which is smaller than the first set.

2. The position-determining device according to claim 1, wherein the image-processing device is configured to determine a subset of the possible object in the 2D image as only 1 pixel.

3. The position-determining device according to claim 2, wherein the image-processing device is configured to determine the subset of the possible object in the 2D image as only 1 pixel surrounded on all sides by other pixels of the first set.

4. The position-determining device according to claim 2, wherein the image-processing device is configured to determine a geometric centre of gravity of the possible object.

5. The position-determining device according to claim 1, wherein the image-processing device is configured to determine the subset of the possible object in the 2D image as precisely 2 or 3 pixels.

6. The position-determining device according to claim 1, wherein the 2D arrangement of pixels also comprises colour pixels, wherein the 3D time-of-flight camera is configured to record a colour image of the space.

7. The position-determining device according to claim 6, wherein the 2D arrangement of pixels also comprises RGB pixels.

8. The position-determining device according to claim 1, wherein the image-processing device is configured to determine distance information for each of the possible objects for an associated subset of pixels if it recognises several different sets of pixels of the recorded image as possible objects, and is furthermore configured to classify the possible objects on the basis of the determined distance information according to a predetermined classification criterion.

9. The position-determining device according to claim 1, wherein the object is an animal.

10. The position-determining device according to claim 1, wherein the object is a dairy animal.

11. A position-determining device for repeatedly determining a position of an object in a space with respect to the position-determining device, comprising:
   a 2D camera with a 2D arrangement of pixels, configured to repeatedly record an image of the space,
   a height-determining device for determining a height of an object in the space, and
   a control unit which is connected to the camera and the height-determining device and comprises an image-processing device for processing a recorded image, wherein the image-processing device is configured:
      to recognise a possible object in a 2D image on the basis of one or more image-processing criteria, and
      to determine the position of the object with respect to the camera by analysis of the 2D image and a determined height.

12. The position-determining device according to claim 11, wherein the height-determining device comprises a laser distance meter.

13. A milking device for milking a dairy animal, comprising milking cups, a robot arm for attaching the milking cups to teats of the dairy animal, as well as a robot control unit for controlling the robot arm,
wherein the robot control unit comprises the position-determining device according to claim 11.

14. The milking device according to claim 13, wherein the position-determining device is configured to determine the position of the teats of the dairy animal.

15. The milking device according to claim 13, wherein the milking device comprises a milking stall for milking the dairy animal, and wherein the position-determining device is configured to determine whether a dairy animal is present in the milking stall and/or to determine a position of the dairy animal in the stall.

16. The milking device according to claim 15, wherein the robot control unit is configured to control the robot arm on the basis of the position of the dairy animal in the milking stall determined by the position-determining device.

17. The milking device according to claim 13, provided with the position-determining device, wherein the height-determining device comprises an animal identification-device for identifying the dairy animal to be milked, as well as a database which is operatively connected to the milking device that contains a height for each dairy animal, and wherein the height-determining device determines the height of the dairy animal by retrieving height data associated with the identified dairy animal from the database.

18. The position-determining device according to claim 11, wherein the height-determining device comprises a series of photoelectric cells.

* * * * *